United States Patent
Elison et al.

(10) Patent No.: US 10,446,808 B2
(45) Date of Patent: Oct. 15, 2019

(54) SYSTEMS AND METHODS FOR A FLEXIBLE BATTERY HANDLE ASSEMBLY FOR LEAD-ACID BATTERIES

(71) Applicant: CPS Technology Holdings LLC, New York, NY (US)

(72) Inventors: Nicholas E. Elison, Milwaukee, WI (US); Christopher M. Bonin, Glendale, WI (US)

(73) Assignee: CPS Technology Holdings LLC, New York, NY (US)

( * ) Notice: Subject to any disclaimer, the term of this patent is extended or adjusted under 35 U.S.C. 154(b) by 359 days.

(21) Appl. No.: 15/234,327

(22) Filed: Aug. 11, 2016

(65) Prior Publication Data

US 2018/0047953 A1 Feb. 15, 2018

(51) Int. Cl.
*H01M 2/10* (2006.01)
*H01M 10/06* (2006.01)

(52) U.S. Cl.
CPC ......... *H01M 2/1005* (2013.01); *H01M 2/10* (2013.01); *H01M 10/06* (2013.01); *H01M 2220/20* (2013.01)

(58) Field of Classification Search
CPC .... H01M 10/06; H01M 2220/20; H01M 2/10; H01M 2/1005
See application file for complete search history.

(56) References Cited

U.S. PATENT DOCUMENTS

| | | | |
|---|---|---|---|
| 3,956,022 A | 5/1976 | Fox | |
| 5,283,137 A | 2/1994 | Ching | |
| 5,440,785 A | 8/1995 | McDonald | |
| 5,670,274 A | 9/1997 | Forrer | |
| 6,117,588 A | 9/2000 | Campbell et al. | |
| 6,177,211 B1 | 1/2001 | Lawrence | |
| 6,942,945 B2 | 9/2005 | Andersen et al. | |
| 7,836,556 B1 | 11/2010 | Medeiros | |
| 8,263,257 B2 | 9/2012 | Bielawski et al. | |
| 2005/0069762 A1 | 3/2005 | Daley et al. | |

FOREIGN PATENT DOCUMENTS

JP 2001155705 6/2001

OTHER PUBLICATIONS

PCT/US2017/042438 International Search Report dated Sep. 5, 2017.

*Primary Examiner* — Sarah A. Slifka
*Assistant Examiner* — Victoria H Lynch
(74) *Attorney, Agent, or Firm* — Boardman & Clark LLP

(57) ABSTRACT

A lead-acid battery includes a handle assembly coupled to a polymer packaging of the battery. The handle assembly includes a woven fabric strap capable of laying substantially flat over a cover of the battery when the handle assembly is not in use. The handle assembly includes a first tab overmolded about a first end of the woven fabric strap, wherein the first tab is loaded into a first slot inset into a first end portion of the polymer packaging of the battery. The handle assembly also includes a second tab overmolded about a second end of the woven fabric strap, wherein the second tab is loaded into a second slot inset into a second end portion of the polymer packaging of the battery, and wherein a length of the first and second tabs is at least twice a width of the woven fabric strap.

20 Claims, 13 Drawing Sheets

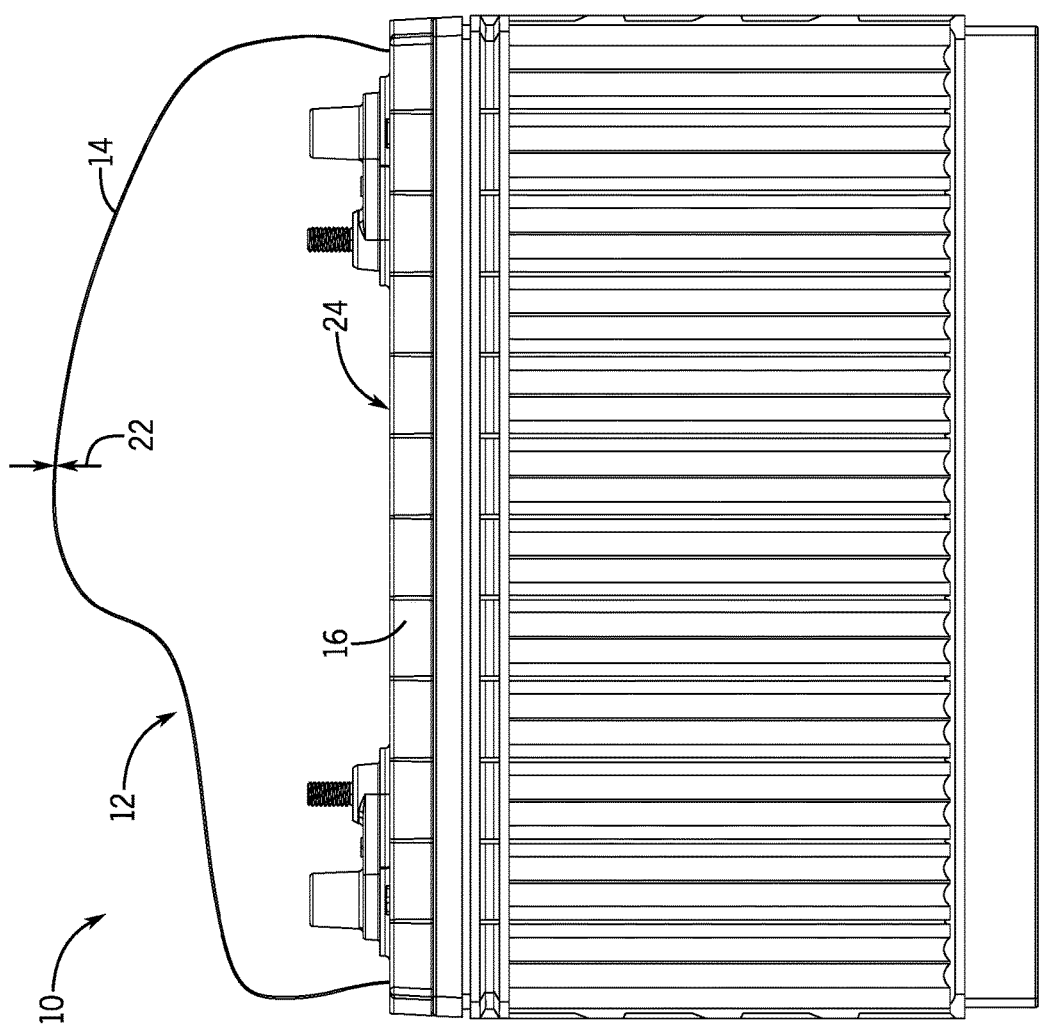

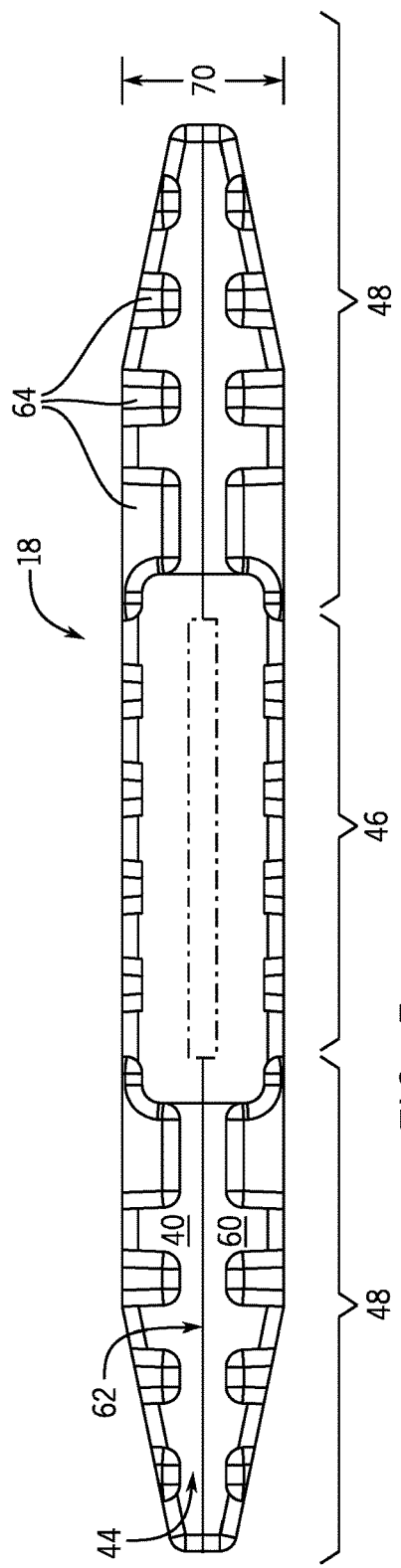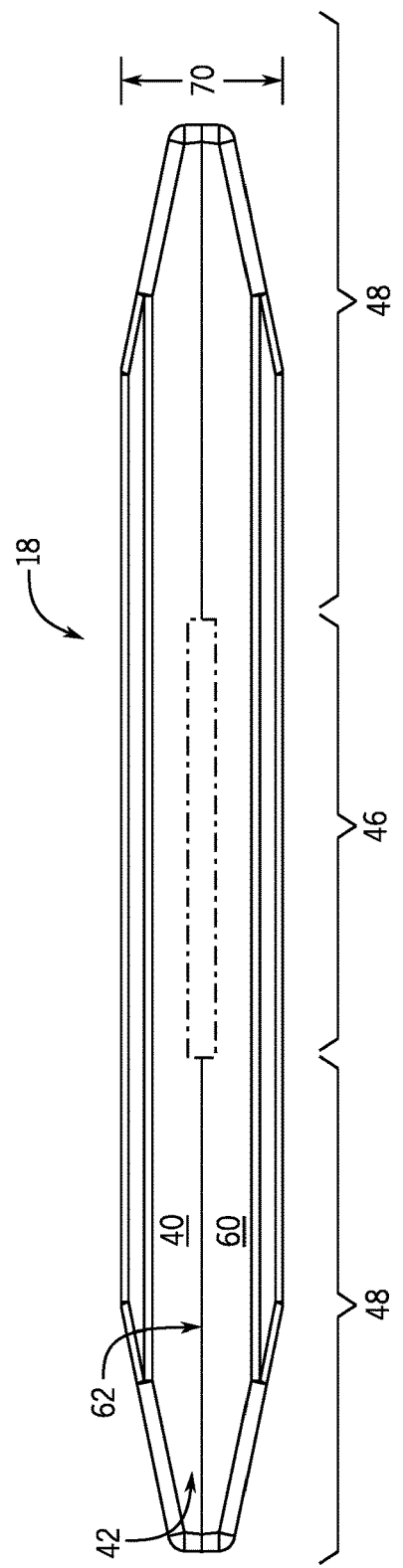

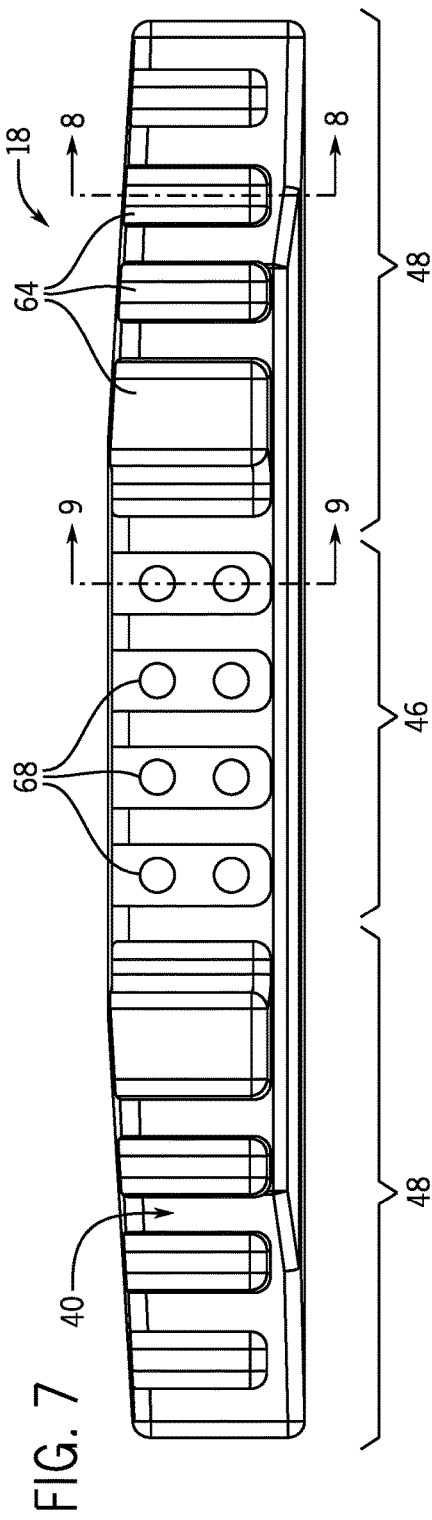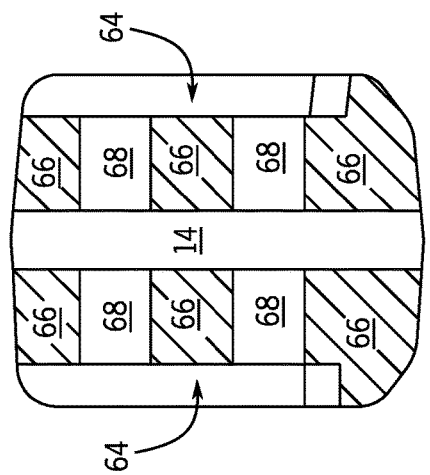

SYSTEMS AND METHODS FOR A FLEXIBLE BATTERY HANDLE ASSEMBLY FOR LEAD-ACID BATTERIES

BACKGROUND

The present disclosure relates generally to batteries, and more specifically, to flexible handle designs for lead-acid batteries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Lead-acid batteries generally include an outer packaging that houses and protects the internal elements of the battery. Certain batteries, such as large-capacity lead-acid batteries, can weigh a considerable amount (e.g., in excess of 50 pounds). As such, the packaging of such batteries usually includes features, such as handles or grips, to enable the customer to lift, transport, and position the battery. To ensure durability, such handles may be expected to withstand several times (e.g., between two to five times) the weight of the battery under various conditions (e.g., at room temperature, at elevated temperatures, at low temperatures).

However, battery handles that extend or protrude away from the surface of the packaging can present issues. For example, when batteries are stacked on a pallet for shipping, if each module includes a handle that extends from the top of its packaging, then the handles of the batteries located in the lower portion of the stack may be significantly stressed under the weight of batteries positioned above. As a result, shipments of batteries may unacceptably arrive at the customer having broken or damaged handles.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a lead-acid battery includes a handle assembly coupled to a polymer packaging of the battery. The handle assembly includes a woven fabric strap capable of laying substantially flat over a cover of the battery when the handle assembly is not in use. The handle assembly includes a first tab overmolded about a first end of the woven fabric strap, wherein the first tab is loaded into a first slot inset into a first end portion of the polymer packaging of the battery. The handle assembly also includes a second tab overmolded about a second end of the woven fabric strap, wherein the second tab is loaded into a second slot inset into a second end portion of the polymer packaging of the battery, and wherein a length of the first and second tabs is at least twice a width of the woven fabric strap.

In another embodiment, a method of manufacturing a lead-acid battery includes disposing a handle assembly of the battery near a cover of a polymer packaging of a battery, wherein the handle assembly includes: a woven fabric strap capable of laying substantially flat over the cover of the battery; a first tab overmolded about a first end of the woven fabric strap; and a second tab overmolded about a second end of the woven fabric strap. The method includes loading the first tab of the handle assembly into a first slot inset into a first end portion of the cover of the polymer packaging. The method further includes loading the second tab of the handle assembly into a second slot inset into a second end portion of the cover of the polymer packaging to yield the battery.

In another embodiment, a lead-acid battery includes a polymer packaging having a first slot defined in a first end portion of a cover of the polymer packaging and a second slot defined in a second end portion of the cover of the polymer packaging. The battery also includes a handle assembly coupled to the polymer packaging of the battery, wherein the handle assembly includes: a woven fabric strap capable of laying substantially flat over the cover of the battery; a first tab overmolded about a first end of the woven fabric strap, wherein the first tab is loaded into the first slot of the polymer packaging; and a second tab overmolded about a second end of the woven fabric strap, wherein the second tab is loaded into the second slot of the polymer assembly.

DRAWINGS

Various aspects of this disclosure may be better understood upon reading the following detailed description and upon reference to the drawings in which:

FIG. 1C is a side elevational view of the battery of FIG. 1A, in accordance with certain embodiments of the present technique;

FIG. 5 is a side elevational view of the outer side of the tab of FIG. 3, in accordance with certain embodiments of the present technique;

FIG. 6 is a side elevational view of the inner side of the tab of FIG. 3, in accordance with certain embodiments of the present technique;

FIG. 7 is a plan view of the top side of the tab of FIG. 3, in accordance with certain embodiments of the present technique;

FIG. 8 is a cross-sectional view of the tab of FIG. 7, taken along the line 8-8, in accordance with certain embodiments of the present technique;

FIG. 9 is a cross-sectional view of the tab of FIG. 7, taken along the line 9-9, in accordance with certain embodiments of the present technique;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, handles are useful features for lifting and moving batteries. However, when the batteries are stacked for shipping, handles with limited flexibility that extend or protrude away from the surface of the battery packaging may suffer from damage during transport. It is now recognized, therefore, that it may be desirable to utilize more flexible and durable handles for certain applications, and to prevent damage to the handles during shipping. Accordingly, present embodiments are directed toward highly flexible battery handle assemblies that can lay flat against the top of the battery when the handle is not in use, which prevents damage to the handle assembly during shipping.

As discussed in greater detail below, the disclosed handle assembly generally includes a woven fabric strap having two overmolded polymer tabs disposed on both ends. These tabs may be loaded into corresponding slots that are inset into (e.g., extend within, defined within) the end portions of the polymer packaging of a battery to secure the handle assembly to the battery. Embodiments of the disclosed handle assembly demonstrate acid resistance and high strength (e.g., loads greater than two to five times the weight of the battery) at room temperature (e.g., 70° F.), low temperature (e.g., 0° F.), and high temperature (e.g., 120° F.). Certain embodiments of the disclosed handle assembly are also compatible with certain existing battery package and slot designs. Additionally, the disclosed handle assembly allows for ready manufacture and assembly, and it securely remains affixed to the packaging of the battery after assembly.

Figure 1A:
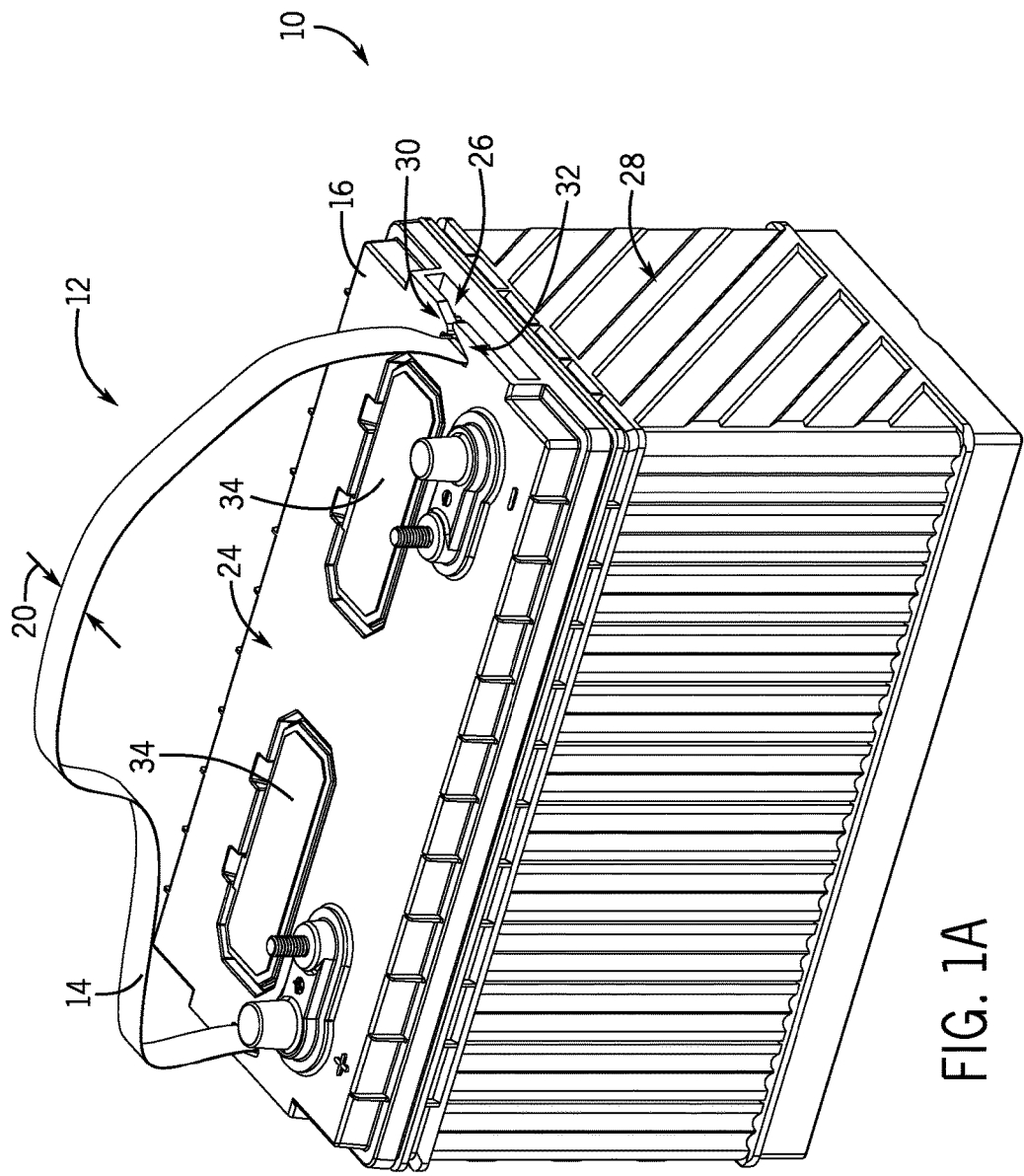
FIG. 1A is perspective view of a lead-acid battery having a handle assembly, in accordance certain with embodiments of the present technique.
Figure 1B:
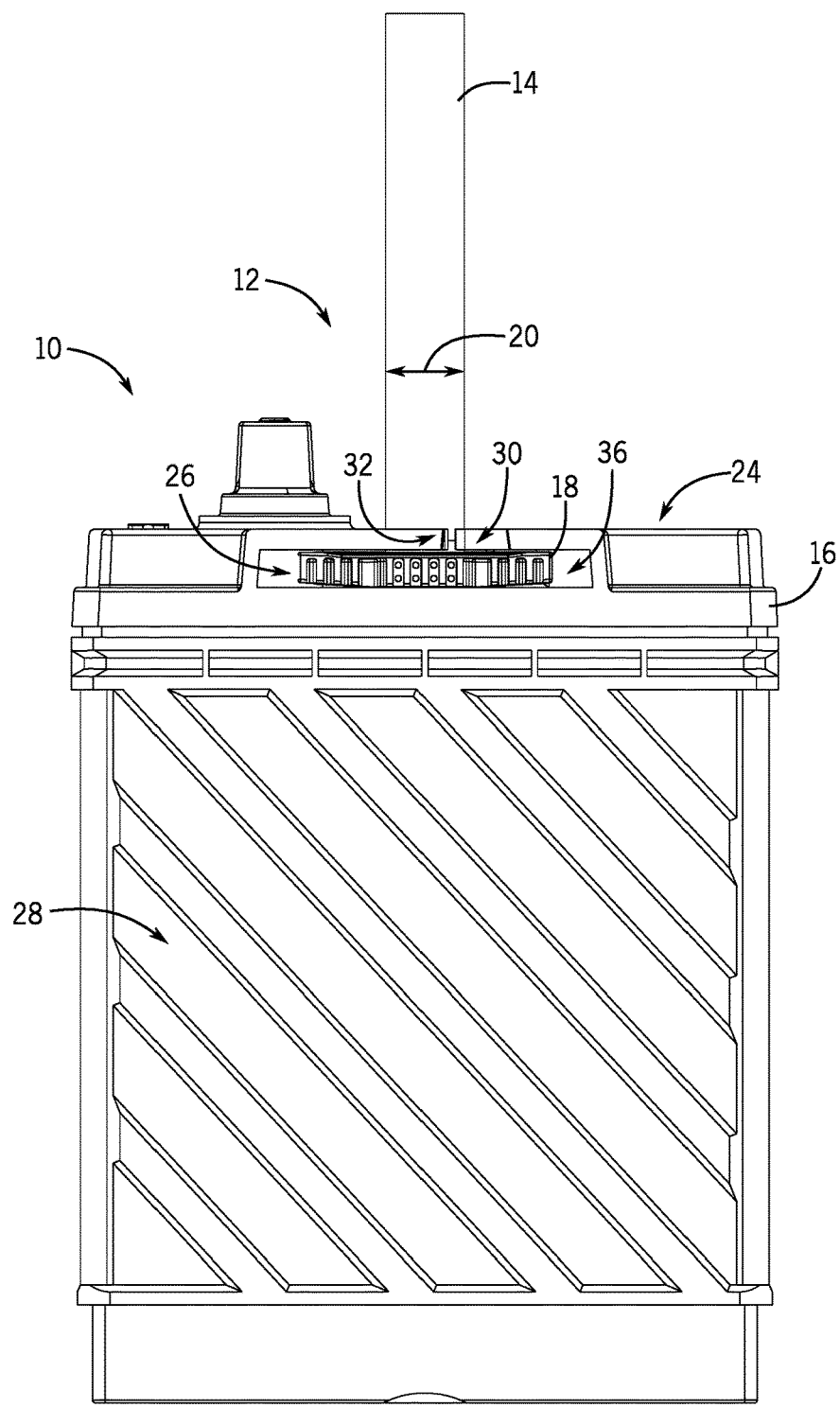
FIG. 1B is an end-on view of the battery of FIG. 1A, in accordance with certain embodiments of the present technique.

With the foregoing in mind, FIGS. 1A, 1B, and 1C illustrate an example of a lead-acid battery 10 having a handle assembly 12, in accordance with embodiments of the present approach. It may be appreciated that, due to the density of lead, the disclosed battery handle assembly affords particular advantages to lead-acid batteries 10, which can weigh 50 lbs. or more, depending on the capacity of the battery 10. In certain embodiments, the battery 10 may be an automotive battery used to provide electrical power to an automotive vehicle, such as a car, truck, recreational vehicle, powersport vehicle, or boat. By specific example, in certain embodiments the battery 10 may be a marine battery, which tend to have high capacities, greater weight, and are well-sealed for providing reliable power in harsh marine environments.

The handle assembly 12 of the battery 10 illustrated in FIGS. 1A-C includes a woven fabric strap 14, which serves as the gripping portion of the handle assembly 12, and is secured to the polymer packaging 16 of the battery 10 via a pair of overmolded polymer tabs 18 (FIG. 1B). A width 20 and thickness 22 of the woven fabric strap 14 may be selected, at least in part, based on the weight of the battery 10. For example, in certain embodiments, the woven fabric strap 14 may be rated for loads between five and ten times the weight of the battery 10 or more. Moreover, unlike a molded plastic handle, the woven fabric strap 14 of the illustrated handle assembly 12 is highly flexible, and can be repeatedly bent, folded, rolled, and/or compressed to lay substantially flat against a cover 24 (e.g., top portion 24) of the battery 10 without damage.

As shown in FIG. 1B, the tabs 18 of the disclosed handle assembly 12 are loaded into corresponding slots 26 that extend into the polymer packaging 16 of the battery 10. In certain embodiments, the slots 26 may be defined within (e.g., inset into, extend into) any end portion 28 (or side portion) of the battery 10 without protruding or extending from the end portion 28 (or side portion). It may be appreciated that previous slot designs frequently extend or protrude out from the end portions 28 of the battery 10, and therefore, such slots are more vulnerable to breaking during transport and/or may impart additional issues for applications that are sensitive to changes or variations in the dimensions of the battery.

In certain embodiments, the slots 26 may be disposed near (e.g., less than 10 mm from, immediately adjacent to, or within) the cover 24 of the battery 10. In certain embodiments, the slots 26 may be defined in a side or end portion of the cover 24 of the battery 10. As best shown in FIG. 1B, the slots 26 of the illustrated embodiment each include upper portions 30 that extend through (e.g., are defined in, are inset into) a top side of the cover 24 of the packaging 16 of battery 10. These upper portions 30 allow the woven fabric strap 14 to extend from the tabs 18 loaded in the slots 26 through the top side of the cover 24 of the polymer packaging 16. Furthermore, in certain embodiments, these upper portions 30 may include a narrowed region 32 (e.g., a guide for the woven fabric strap 14) having a width that is less than the width 20 of the woven fabric strap 14 to retain the strap 14 within the upper portion 30 once the tab 18 is loaded into the slot 26. Additionally, the slot 26 may be in fluid communication with one or more vent features that are disposed in recessed portions of the cover 24 below the vent covers 34. It may be appreciated that these vent features may enable the release of gases generated within the packaging 16 of the battery 10 during operation, while preventing the release of liquids (e.g., electrolyte, acid). In certain embodiments, the vent features include flame arrestors, which generally function to capture and block an open flame (e.g., an ignition source) from entering and igniting gases (e.g., hydrogen, oxygen) within the packaging 16 of the battery 10. It may be appreciated that, unlike other handle designs, the soft and flexible nature of the disclosed handle assembly 12 prevents the handle assembly 12 from damaging (e.g., cracking, bending, breaking) the vent features or vent covers 22 during shipping and use. Further, as discussed below, the disclosed handle assembly 12 does not hamper or impair the ability of the vent features of the battery 10 to function properly.

For example, as illustrated in FIG. 1B, a drainage channel 36 is defined in (e.g., inset, extends into) the end portion of the cover 24 and is in fluid communication with the recessed regions below the vent covers 34. The drainage channel 36 is designed to direct gases vented released by the vent features, and/or liquids (e.g., water, brine) that seep around the vent covers 34 and into the underlying recessed regions, to be released (e.g., drain) from the end portion 28 of the battery 10. It should be noted that since the slots 26 also extend into and are in fluid communication with these drainage channels 36, it is presently recognized that it is desirable that the tabs 18 of the handle assembly 12 do not substantially block (e.g., prevent, obstruct, interfere with) these drainage channels 36 or otherwise obstruct the release of gases or liquids via these drainage channels 36 once the tabs 18 are engaged within the slots 26. It should be appreciated that the shape of the slot 26, the upper region 30, and/or the narrowed region 32 may vary in other embodiments, in accordance with the present disclosure.

The handle assembly 12 of the battery 10 facilitates lifting and carrying of the battery 10. As such, the handle assembly 12 is designed to withstand the same conditions in which the battery 10 is expected to be operated, including high temperature, low temperature, and wet environments, over the life of the battery 10. Further, especially for embodiments in which the battery 10 is a lead-acid battery 10, the handle assembly 12 may be made from acid-resistant materials to prevent degradation in the event that acid or acidic fumes are released from the interior of the battery 10. In particular, in certain embodiments, the tabs 18 may be made of overmolded polypropylene, while the woven fabric strap 14 may be made of polypropylene fibers, both of which are sufficiently acid-resistant.

Figure 2:
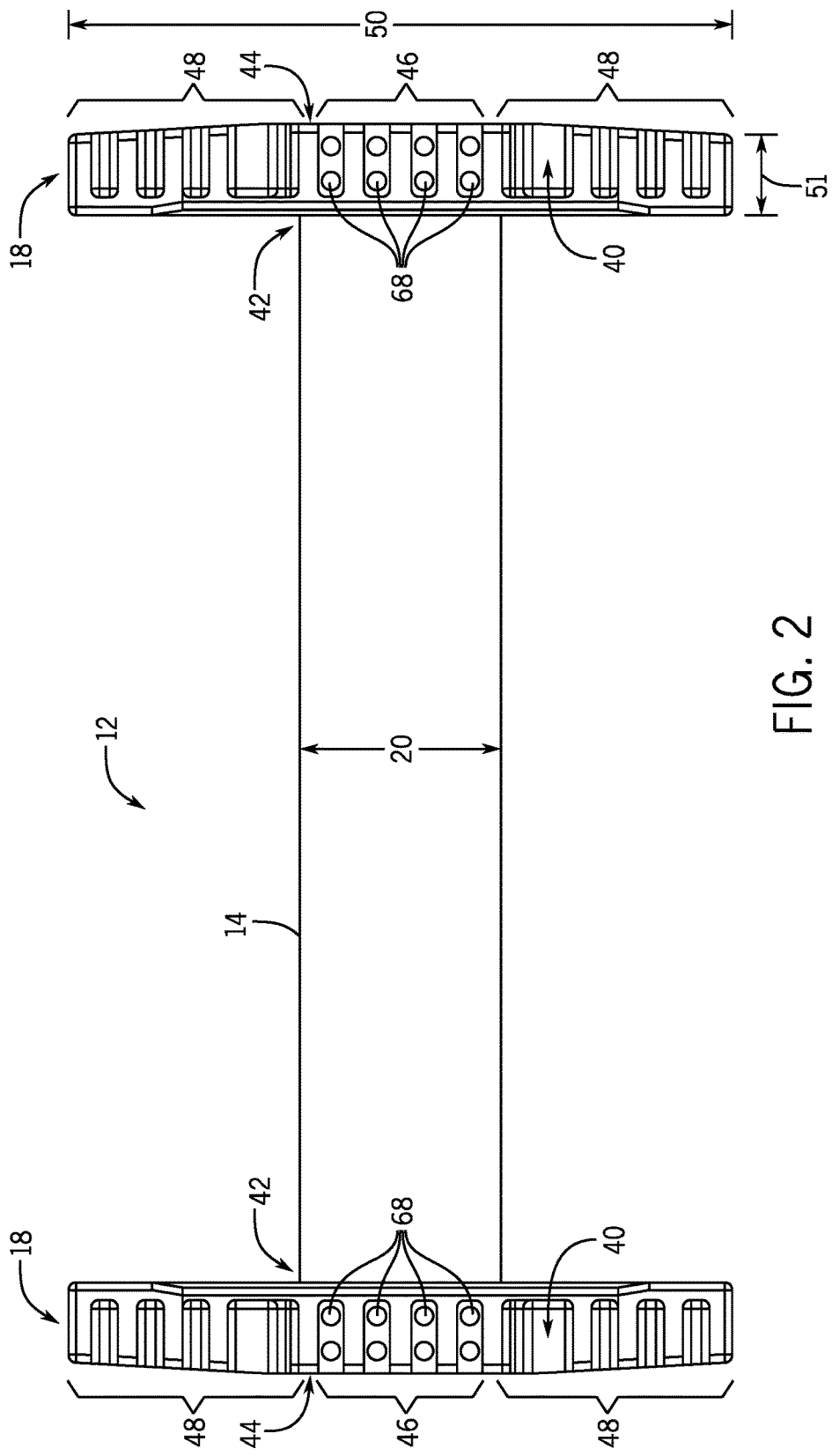
FIG. 2 is a perspective view of the handle assembly of FIG. 1A, in accordance with certain embodiments of the present technique.
Figure 3:
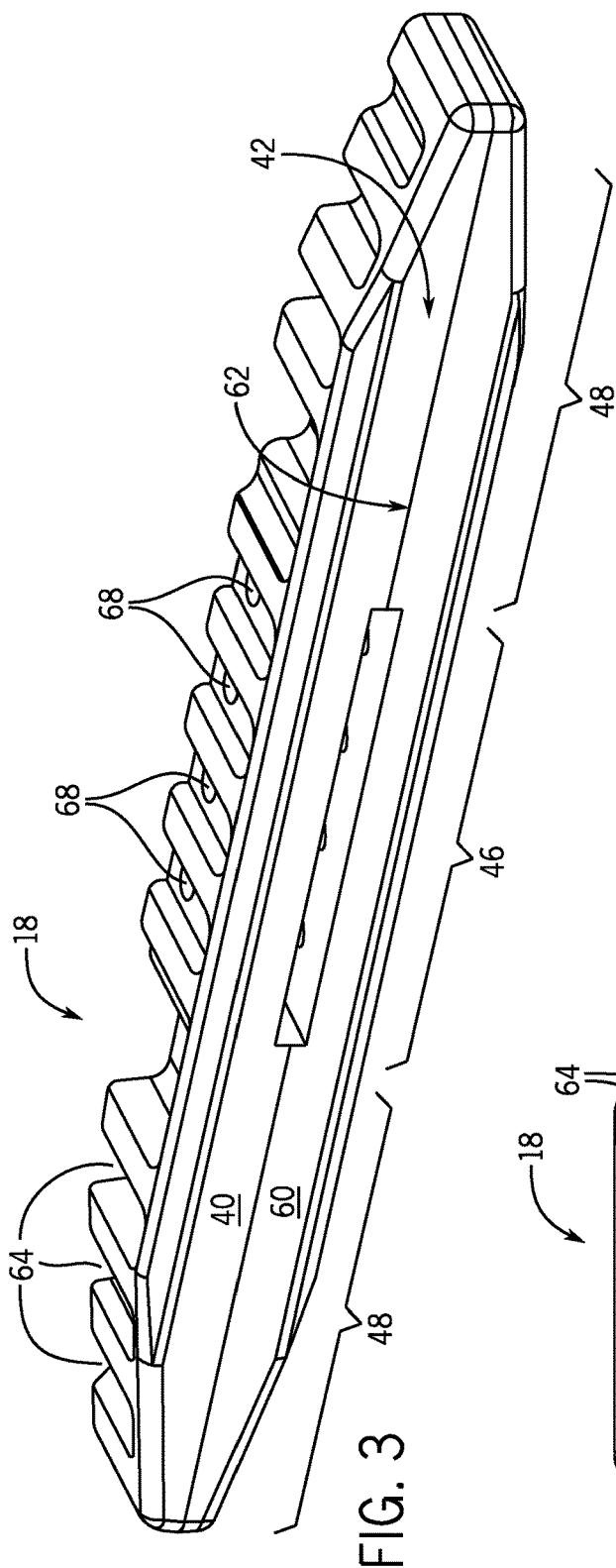
FIG. 3 is a perspective view of a tab of the handle assembly of FIG. 2, in accordance with certain embodiments of the present technique.

A perspective view of an example battery handle assembly 12 is illustrated in FIG. 2, in accordance with present embodiments. As mentioned above, the illustrated handle assembly 12 includes the woven fabric strap 14 having polymer tabs 18 overmolded about both ends of the strap 14. While only a top side 40 of the tabs 18 is visible in the view of FIG. 2, the example tabs 18 also include a bottom side, identical to the first, disposed on the opposite side of the woven fabric strap 14, as illustrated in FIGS. 3, 5, and 6 below. However, as discussed below, in other embodiments, tabs 18 having asymmetric geometries may also be used. Each tab 18 may be described as having an inner side 42, from which the woven fabric strap 14 extends, as well as an outer side 44 that is disposed on the outer ends of the handle assembly 12. Each tab 18 includes a central portion 46 that is overmolded around and in direct contact with the woven fabric strap 14. Additionally, each tab 18 includes respective end portions 48 that extend away from the central portion 46 and the woven fabric strap 14 such that the length 50 of the tab 18 is greater than the width 20 of the strap 14. For example, in certain embodiments, the length 50 of each tab 18 may be about twice the width 20 of the woven fabric strap 14 or more. When loaded within the slot 26 of the battery 10, as illustrated in FIGS. 1A and 1B, it is presently recognized that the length 50 helps to distribute the weight of the battery 10 along a larger portion of the polymer packaging 16 within the slot 26, reducing the potential for the slot 26 and/or the polymer packaging 16 near the slot 26 to fail. Additionally, the tab 18 may also be described as having a width 51 that extends along a part of the length of the woven fabric strap 14. In certain embodiments, the width 51 of the tab 18 may be less than 20 millimeters (mm), less than 15 mm, less than 10 mm, or between approximately 5 mm and 10 mm, while still providing sufficient bonding between the central portion 46 of the tab 18 and the woven fabric strap 14 to enable the properties discussed below.

It may be appreciated that, in certain embodiments, the tabs 18 may be loaded into the slots 26 with the handle assembly 12 generally having the orientation shown in FIG. 2 (hereafter referred to as the first orientation), such that the inner side 42 of the tabs 18 is disposed toward or faces the end portion 28 of the battery 28, and the outer side 44 of the tab 18 is visible when viewing the slot 26. In other embodiments, as illustrated in FIG. 1B, the tabs 18 may be loaded into the slots 26 such that the inner side 42 of the tabs 18 is disposed toward or faces the cover 24 of the battery 10, and the top side 40 of the tab 18 is visible when viewing the slot 26 (hereafter referred to as the second orientation). It is presently recognized that, while the first orientation may be sufficient for a battery 10 of lower weight (e.g., less than 50 lbs), placing the tabs 18 in the second orientation enables the same handle assembly 12 to achieve higher target weight requirements when tested to failure compared to the first orientation.

For example, in a series of pull tests using a 60 lbs. battery as a model, and with the tabs 18 of the handle assembly 12 loaded in the second orientation described above, the loaded handle assembly 12 illustrated in FIGS. 1A-C was tested under a load to the point of failure, in which either the woven fabric strap 14 separated from one of the overmolded tabs 18 or the portion of the polymer packaging 16 forming the slots 26 was substantially deformed and/or broken. It may be appreciated that, for this testing, the handle assembly 12 is secured to the battery 10, and a lifting force is applied to the middle of the woven fabric strap 14, such that the tabs 18 are pulled at an angle (e.g., a portion of the force pulling the tabs 18 upward, and a portion of the force pulling the tabs 18 toward the center of the cover 24) so the handle assembly 12 experiences greater strain than if the tabs 18 were only pulled in a single direction (e.g., upward). In these tests, embodiments of the handle assembly 12 sustained greater than five times the weight of the battery (i.e., >300 lbs.) as a load in pull tests at 70° F. (i.e., 100 millimeters per minute (mm/min) crosshead speed), with an average load of approximately 360 lbs. before failure. Embodiments of the handle assembly 12 also sustained greater than three times the weight of the battery 10 (i.e., >180 lbs.) as a load in pull tests at 120° F. (i.e., 100 mm/min crosshead speed), with an average of approximately 215 lbs. before failure. The embodiment of the handle assembly 12 also sustained substantially greater than three times the weight of the battery 10 (i.e., >180 lbs.) in jerk tests at 0° F., with an average of approximately 525 lbs. before failure. Accordingly, the disclosed handle assembly 12 enables the manufacture of batteries 10 having handle assemblies that demonstrate acceptable strength under a wide range of operational and/or environmental conditions.

Figure 4:
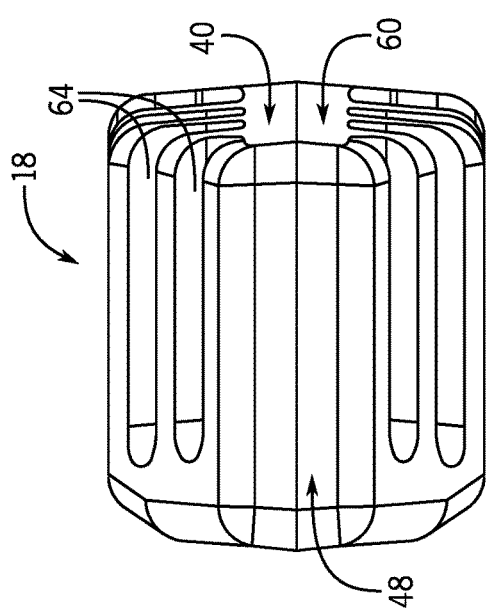
FIG. 4 is an end-on view of the tab of FIG. 3, in accordance with certain embodiments of the present technique.
Figure 10:
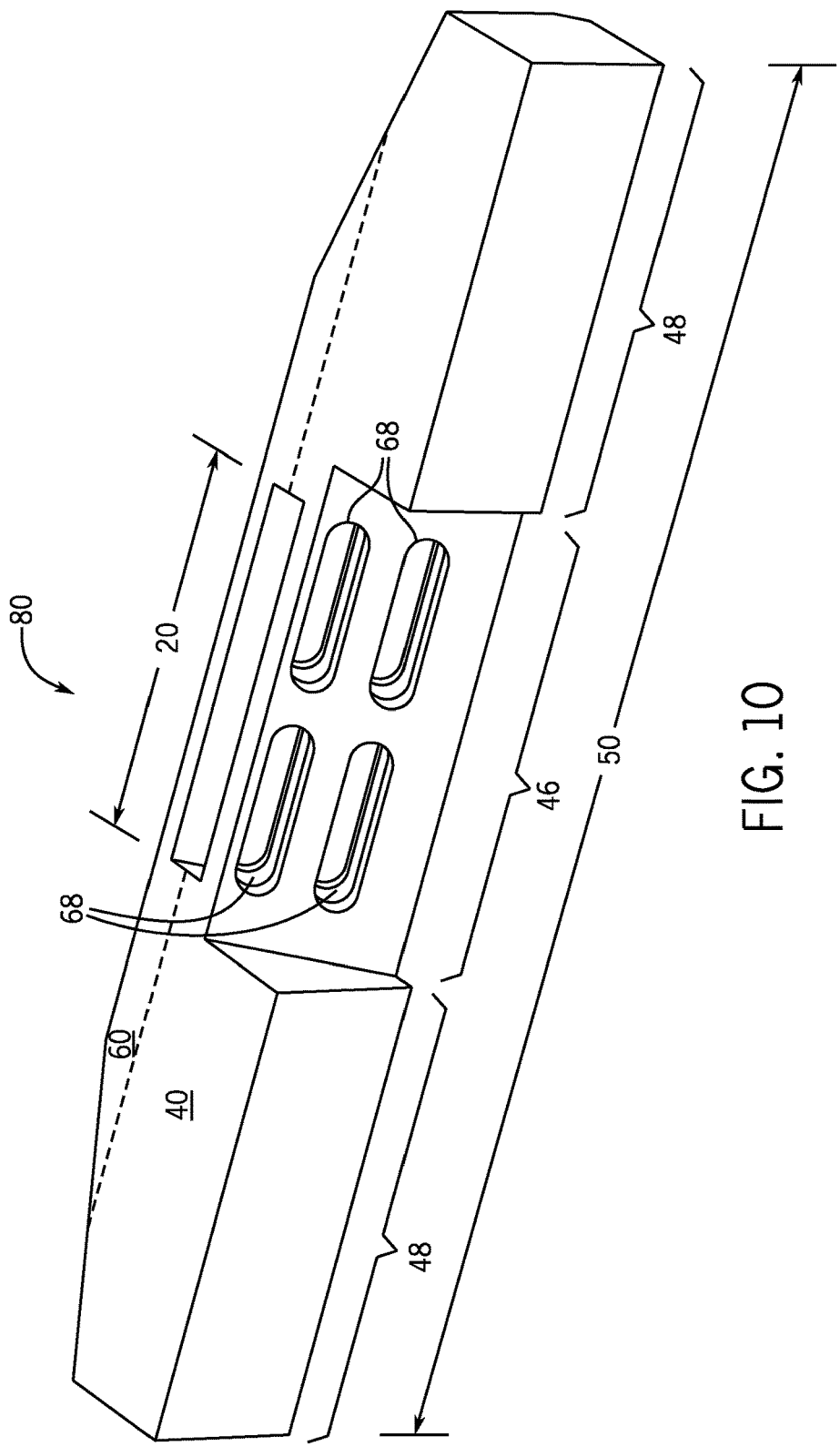
FIG. 10 is a perspective view of another embodiment of a tab for the handle assembly, in accordance with certain embodiments of the present technique.
Figure 11:
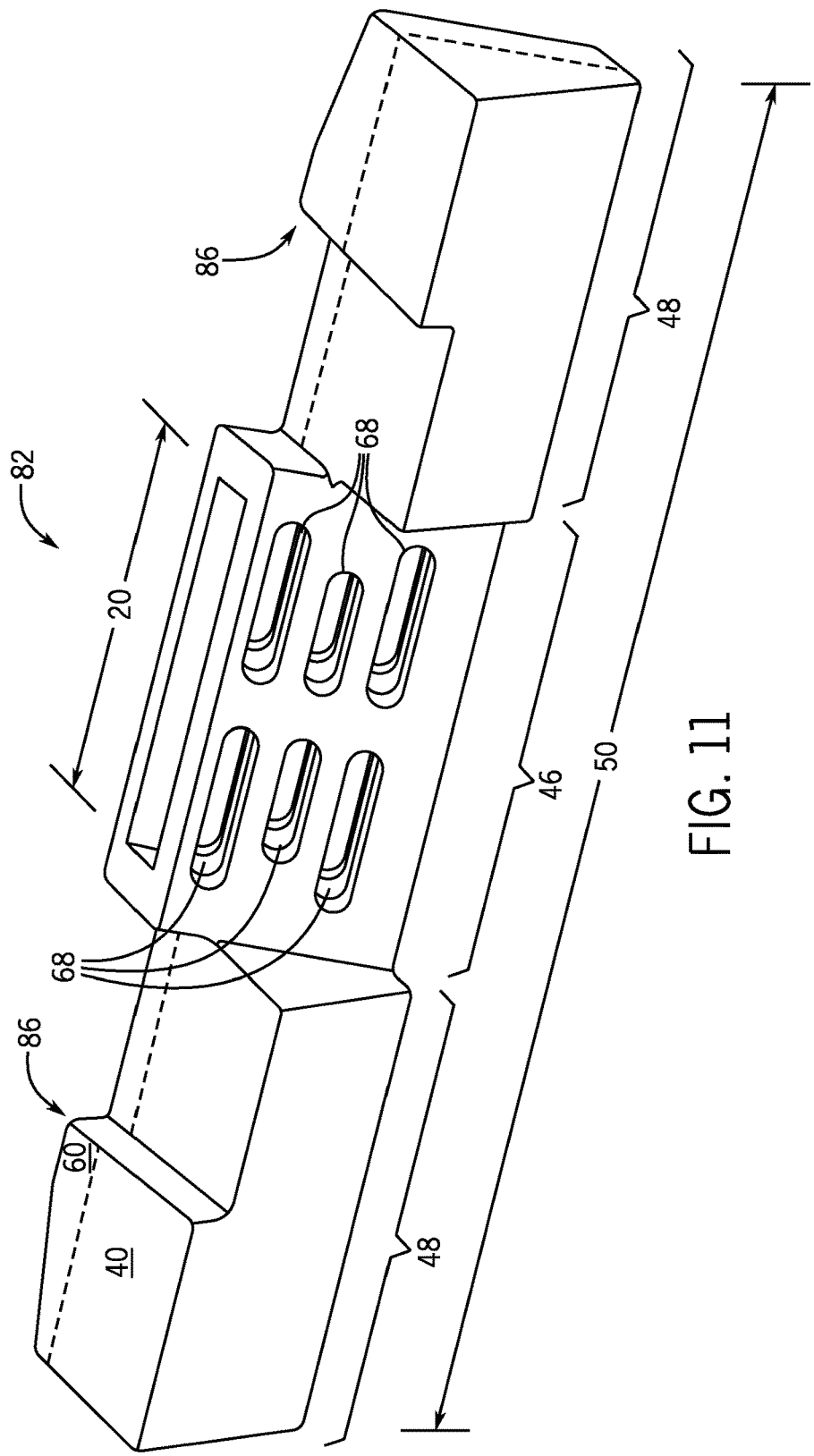
FIG. 11 is a perspective view of another embodiment of a tab for the handle assembly, in accordance with certain embodiments of the present technique.
Figure 12:
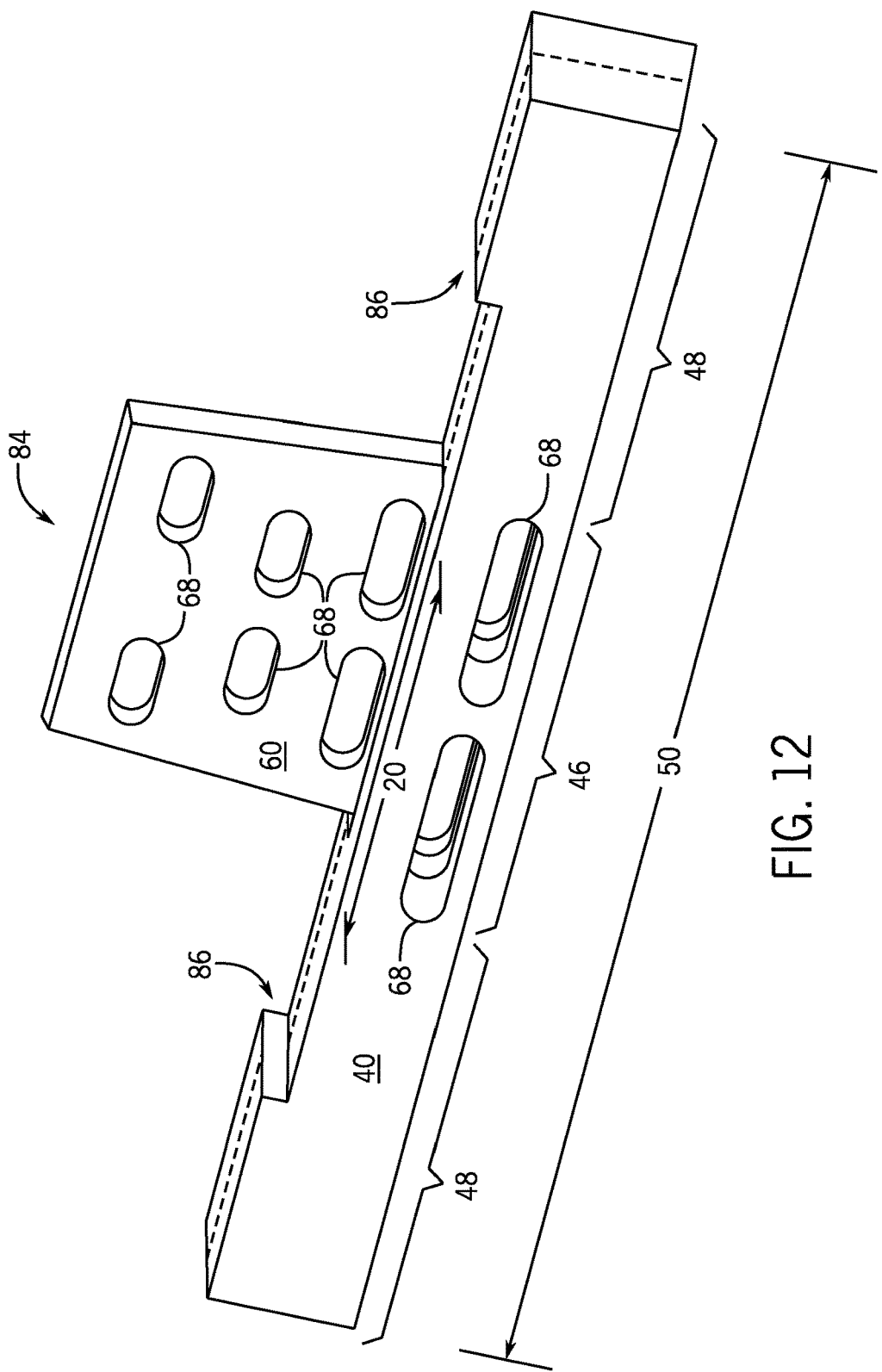
FIG. 12 is a perspective view of another embodiment of a tab for the handle assembly, in accordance with certain embodiments of the present technique.

FIGS. 3-9 illustrate various perspective and cross-sectional views of the tab 18 from the embodiment of the handle assembly 12 illustrated in FIGS. 1 and 2, with the woven fabric strap 14 omitted for illustrative purposes. In particular, FIG. 3 provides a perspective view of the inner side 42 of the tab 18, while FIG. 4 provides an end-on view of the end 48 tab 18. FIGS. 5 and 6 provide perspective views of the inner side 42 and the outer side 44 of the tab 18. FIG. 7 provides a perspective view of the top side 40 of the tab 18, while FIGS. 8 and 9 provide cross-sectional views of different portions of the tab 18. It should be appreciated that other tab designs may be used in accordance with certain embodiments of the present disclosure. Indeed, as discussed below with respect to FIGS. 10-12, in other embodiments, overmolded tabs having other shapes may be used, including rectangular prismatic shapes, cylindrical shapes, "dog bone" shapes, or other suitable shapes, in accordance with embodiments of the present approach. However, it is presently recognized that the shape of the tab 18 illustrated by FIGS. 3-9 provides advantages over other shapes, for example, in terms of shear strength, maximizing length to distribute weight across the slot, and avoiding obstruction of various battery features.

With reference to FIGS. 3-7, various features of the example embodiment of the tab 18 are illustrated. For example, the illustrated tab 18 includes an identical top portion 40 and bottom portion 60 that meet to form a central rib 62 along the midline of the tab 18. The central rib 62 provides a substantial portion of the structural integrity of the tab 18. Additionally, for the tab 18 illustrated in FIGS. 3-7, the woven fabric strap 14 (not illustrated) is indicated as traversing the central portion 46 of the tab 18, remaining in a plane substantially parallel to the surface of the top side 40 and the bottom side 60 of the tab 18. In other embodiments, the woven fabric strap 14 may traverse the tab 18 at an angle with respect to the surface of the top side 40 and/or bottom side 60 of the tab 18 to increase the amount of overlapping surface area between the woven fabric strap 14 and the tab 18 in the central portion 46 of the tab 18.

The tab 18 illustrated in FIGS. 3-7 further includes various material saver portions 64 which do not include the overmolded polymer 66. These material saver portions 64 reduce the amount of polymer 66 consumed during manufacturing of the tab 18, as well as improve the porosity and structural integrity of the tab 18 relative to other tabs 18 that lack these material saver portions 66. To better illustrate these features, FIG. 8 is a cross-sectional view of the tab 18, taken along the line 8-8, as illustrated in FIG. 7. The cross-sectional view of FIG. 8 demonstrates the central rib feature 62 that is made of the overmolded polymer 66, as described above, disposed between two material saver portions 64.

Additionally, FIG. 9 illustrates a cross-sectional view of the tab 18, taken along the line 9-9 illustrated in FIG. 7, and provides an alternative view of the central portion 46 of the tab 18 that the woven fabric strap 14 traverses. As best illustrated in FIGS. 2, 7, and 9, the tab 18 includes a plurality of holes 68 that, as discussed below, result from one or more retaining features (e.g., pins, rods bars, or plates), that hold the woven fabric strap 14 in place during the overmolding process. Since the shape of the holes 68 generally depends on the shape of the retaining feature, in other embodiments, the holes 68 may have other shapes (e.g., rectangular, ovular, triangular, and so forth) when retaining features having other shapes are used, in accordance with the present disclosure.

As best illustrated in FIGS. 5 and 6, the illustrated embodiment of the tab 18 also includes tapered end portions 48. In other words, the thickness 70 of the tab 18 generally decreases with increasing distance from the central portion 46 and the woven fabric strap 14. It may be appreciated that these tapered end portions 48 enable the tab 18 to have a substantial length 50 (e.g., twice the width 20 of the woven fabric strap 14 or more) without blocking or interfering with the operation of features present in the polymer packaging 16 of the battery 10, such as the vent features discussed above, which allow the battery to vent gases that accumulate within the packaging 16 of the battery 10 during operation. Since such vent features are commonly located near the cover 24 of the polymer packaging 16 of the battery 10 and may be in fluid communication with the slot 26 via the drainage channel 36 (FIG. 1B), the tapered end portions 48 enable the tabs 18 to be securely loaded into the slots 26 without substantially blocking or interfering with the operation or use of these features.

FIGS. 10, 11, 12, and 13 illustrate perspective views of other embodiments of tabs 80, 82, 84, and 88 that can be used in the manufacture of battery handle assemblies 12 of the present approach. Like the tab 18 discussed above, the tabs 80, 82, 84, and 88 each include embodiments of the top side 40 and the bottom side 60 that are disposed on opposite sides of a woven fabric strap, which has again been omitted for illustrative purposes. It should be noted that the shapes of the tabs illustrated in FIGS. 10-13 are not intended to be limiting, and in other embodiments, handle assemblies 12 of the present approach may include various combinations of disclosed features, as well as additional features (e.g., retaining features, material saver portions, structural ribs), in accordance with present embodiments.

Similar to the embodiment of the tab 18 discussed above, the tabs 80, 82, 84, and 88 include a perspective view of the central portion 46, designed to be overmolded around and bind to the woven fabric strap 14 (omitted for illustrative purposes in FIGS. 10-13) and end portions 48 that extend out away from the central portion 46 and the woven fabric strap 14. The central portion 46 of tabs 80, 82, 84, and 88 include a plurality of ovular holes 68 of various sizes that, as mentioned, result from a plurality of retaining features that hold the woven fabric strap into position during the overmolding process. Additionally, similar to the tab 18, the tabs 80, 82, 84, and 88 each have respective lengths 50 substantially greater than a width 20 of the woven fabric strap (e.g., approximately twice the width 20 or more). Further, like the tab 18, the tabs 80, 82, and 88 of FIGS. 10, 11, and 13 have tapered end portions 48 that may generally prevent the tabs 80 and 82 from obstructing a feature (e.g., a fill or vent feature) of the battery 10, in certain embodiments.

However, the tabs 80, 82, 84, and 88, respectively illustrated in FIGS. 10, 11, 12, and 13, also include different features relative to the embodiment of the tab 18 discussed above. For example, for the tabs 80 and 82 of FIGS. 10 and 11, the woven fabric strap 14 is designed to traverse the central portion 46 of the tab 18 at an angle relative to a surface of the top side 40 or bottom side 60 of the tab 18. Additionally, unlike the tab 18, tabs 80, 82, and 84 are substantially asymmetric with respect to the plane of the woven fabric strap 14, and therefore, the upper portion and the lower portion of the mold disposed on opposite sides of the woven fabric strap 14 during the overmolding process have different shapes. The tabs 82 and 84 of FIGS. 11 and 12 include step features 86 on the end portions 48, which may serve as retention features and/or prevent the tabs 82 and 84 from obstructing a feature (e.g., a fill or vent feature) of the battery 10, in certain embodiments. Further, the central portion 46 of the tab 84 of FIG. 12 includes a substantially larger bottom side 60, which generally increases the bonded surface area between the tab 84 and the woven fabric strap 14 to enhance the strength of the bond.

Figure 13:
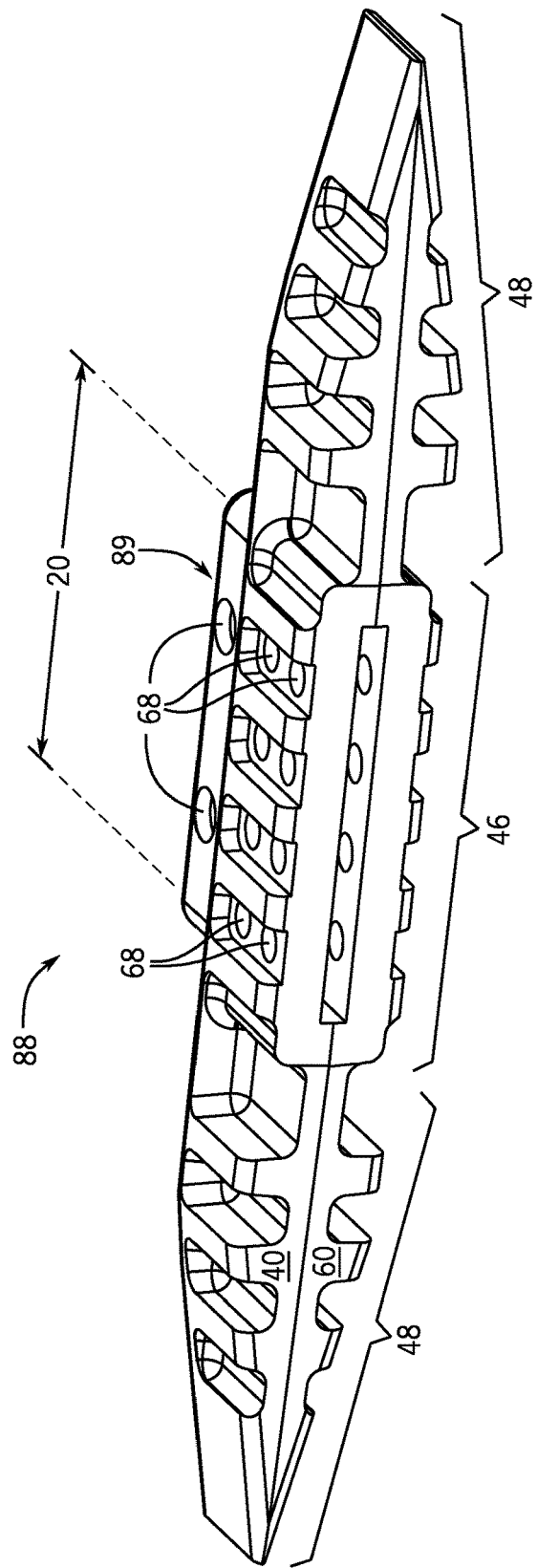
FIG. 13 is a perspective view of another embodiment of a tab for the handle assembly, in accordance with certain embodiments of the present technique.

Additionally, the tab 88 illustrated in FIG. 13 includes an extension 89, which is an additional portion of overmolded polymer that extends a distance along the woven fabric strap 14, away from the central portion 46 of the tab 88. As such, the extension 89 may, in certain embodiments, serve as a guide that enables the woven fabric strap 14 to cleanly pass through the narrowed region 32 in the upper portion 30 of the slot 26, as illustrated in FIGS. 1A-B, such that the woven fabric strap 14 does not become bunched together and resist pass the narrowed region 32 as the tab 88 is loaded into the slot 26. In certain embodiments, the upper portion 30 of the slot 26, illustrated in FIGS. 1A-B, may be pried open to temporarily increase the width of the narrow region 32 such that the extension 89 may traverse the narrowed region 32, and the extension 89 may subsequently be held into position by friction within the upper portion 30, once the tension on the upper portion 30 is released. For example, in certain embodiments, the extension 89 may have dimensions similar (e.g., slightly smaller than) the dimensions of the upper portion 30 of the slot 26 such that, after traversing the narrowed region 32, the extension 89 is secured into place with a tactile and/or auditory feedback (e.g., a snap, a pop, a click) that confirms to the assembler that the tab 88 is engaged in the slot 26. As such, the extension 89 of the tab 88 may enable a more positive engagement between the tab 88 and the slot 26, to provide a more secure and confident coupling between the handle assembly 12 and the battery 10.

Figure 14:
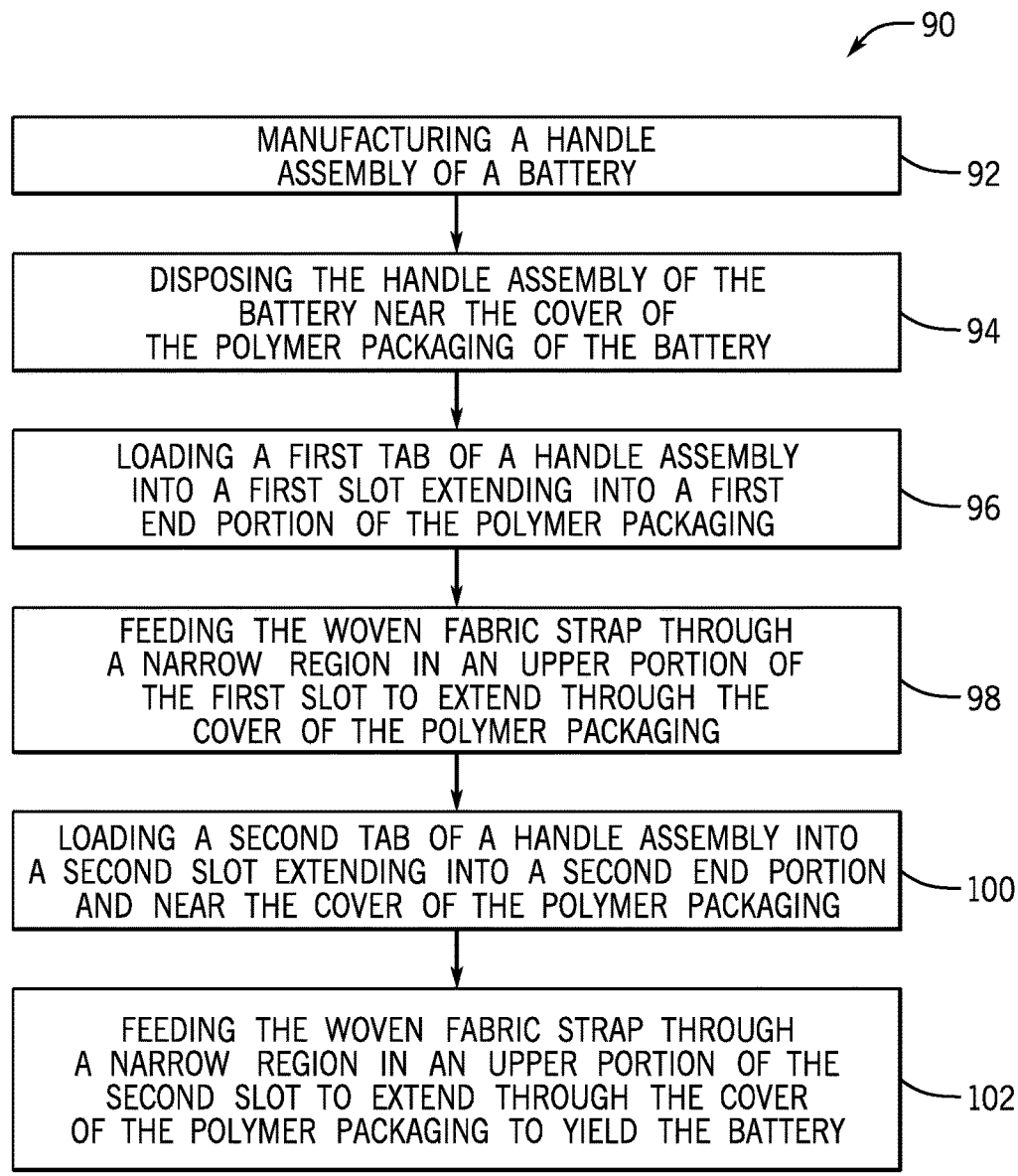
FIG. 14 is a flow diagram of a process for manufacturing a lead-acid battery having a handle assembly, in accordance with certain embodiments of the present technique.

FIG. 14 is a flow diagram illustrating an example of a process 90 for manufacturing the battery 10 having the battery handle assembly 12, in accordance with embodiments of the present approach. The illustrated process 90 begins with the manufacturing (block 92) of the handle assembly, an example of which is provided in FIG. 15, discussed below. Once manufactured, the handle assembly 12 may be disposed (block 94) near the cover 24 of the battery 10 to prepare for assembly. A first tab 18 of the handle assembly 12 may be loaded (block 96) into a first slot 26 on a first side 28 of the battery 10. Then, in certain embodiments, the woven fabric strap 14 that extends from the inner side 42 of the first tab 18 may be fed (block 98) through the narrow region 32 in the upper portion 30 of the first slot 26, such that the woven fabric strap 14 is secured and extends through the cover 24 of the polymer packaging 16 of the battery 10. Subsequently, a second tab 18 of the handle assembly 12 may be loaded (block 100) into a second slot 26 a second side 28 of the battery 10, opposite the first side. Then, in certain embodiments, the woven fabric strap 14 that extends from the inner side 42 of the second tab 18 may be fed (block 102) through a narrow region 32 in an upper portion 30 of the second slot 26, such that the woven fabric strap 14 is secured and extends through the cover 24 of the polymer packaging 16 of the battery 10.

Figure 15:
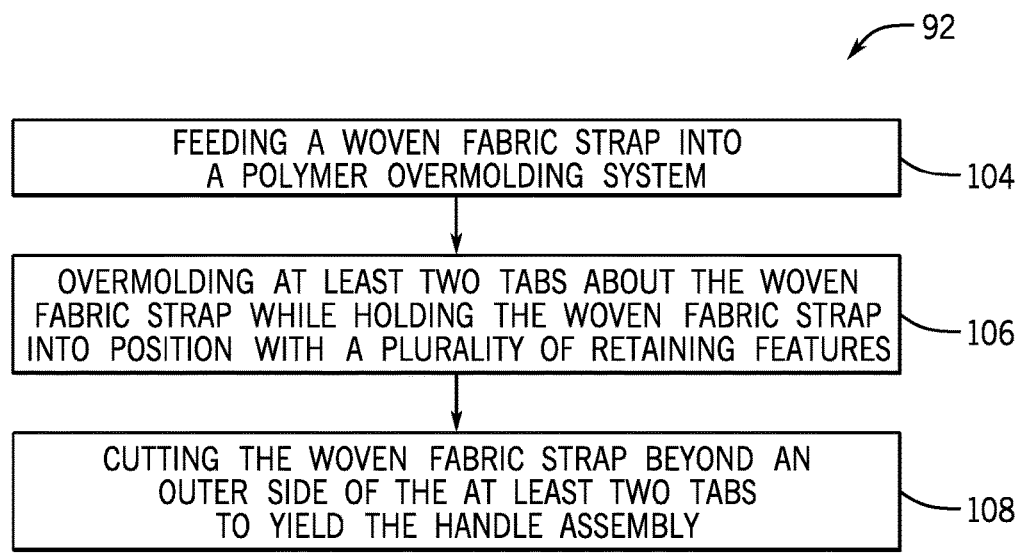
FIG. 15 is a flow diagram of a process for manufacturing a handle assembly for a battery, in accordance with certain embodiments of the present technique.

FIG. 15 is a flow diagram illustrating an example of a process 92 for manufacturing the handle assembly, as referenced in block 92 of FIG. 14, in accordance with embodiments of the present approach. The illustrated process 92 begins with feeding (block 104) a woven fabric strap into a polymer overmolding system. Once fed into the system, one or more (e.g., at least two) tabs are overmolded (block 106) about the woven fabric strap. In certain embodiments, the polymer overmolding system may include a plurality of pins, or another suitable retaining mechanism, to hold the woven fabric strap 14 into position during the overmolding process, which results in the plurality of holes 68 of the tab 18 discussed above. It may be appreciated that, in certain embodiments, at least four tabs 18 may be overmolded along the woven fabric strap 14 at one time: two closely spaced tabs 18 followed by a length of woven fabric strap 14, followed by two more closely spaced tabs 18, in a continuous stream. For such embodiments, the continuous stream of battery handle assemblies 12 exiting the overmolding system are subsequently cut (block 108) between the closely spaced tabs 18 (e.g., substantially flush with the outer side 44 of the tab 18) to yield individual handle assemblies 12.

One or more of the disclosed embodiments, alone or on combination, may provide one or more technical effects including enabling the manufacture of batteries having highly flexible handle assemblies that can lay flat against the top of the battery when the handle is not in use, which prevents damage to the handle assembly during shipping. Present embodiments demonstrate acid resistance and high strength (e.g., loads greater than two to five times the weight of the battery) at room temperature (e.g., 70° F.), low temperature (e.g., 0° F.), and high temperature (e.g., 120° F.). Furthermore, the disclosed handle assembly is generally easy to manufacture and assemble, and it securely remains affixed to the packaging of the battery after assembly. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A lead-acid battery, comprising:
    a polymer packaging comprising:
        a first slot inset into a first end portion of a cover of the polymer packaging and including a first upper opening defined in a top surface of the cover; and
        a second slot inset into a second end portion of the cover of the polymer packaging and including a second upper opening defined in the top surface of the cover;
    a handle assembly coupled to the polymer packaging of the battery, wherein the handle assembly comprises:
        a woven fabric strap capable of laying substantially flat over a cover of the battery when the handle assembly is not in use;
        a first tab overmolded about a first end of the woven fabric strap, wherein the first tab is loaded into the first slot, such that the woven fabric strap extends through the first upper opening in the top surface of the cover; and
        a second tab overmolded about a second end of the woven fabric strap, wherein the second tab is loaded into the second slot, such that the woven fabric strap extends through the second upper opening in the top surface of the cover, wherein a length of the first and second tabs is at least twice a width of the woven fabric strap and wherein the first and second tabs each comprise tapered end portions having thicknesses less than a central portion disposed near the woven fabric strap, and wherein the tapered end portions enable the first and second tabs to load into the first and second slots without obstructing a vent feature in the polymer packaging of the battery.

2. The battery of claim 1, wherein the polymer packaging and the handle assembly comprise polypropylene.

3. The battery of claim 1, wherein the first and second tabs of the handle assembly are loaded into the first and second slots, respectively, such that a side of the first and second tabs from which the woven fabric strap extends faces the cover of the polymer packaging.

4. The battery of claim 1, wherein the first and second tabs of the handle assembly are loaded into the first and second slots, respectively, such that a side of the first and second tabs from which the woven fabric strap extends faces the first and second end portions of the cover of the polymer packaging, respectively.

5. The battery of claim 1, wherein the first and second tabs each comprise a top side and a bottom side that are overmolded about opposite sides of the woven fabric strap, wherein the first and second tabs each comprise a central rib feature formed where the top and bottom sides meet.

6. The battery of claim 5, wherein the woven fabric strap extends through the first and second tabs at an angle relative to a surface of the top or bottom sides of the first and second tabs.

7. The battery of claim 1, wherein the first upper opening comprises a first narrowed region that retains the woven fabric strap in the first upper opening and the second upper opening comprises a second narrowed region that retains the woven fabric strap in the second upper opening.

8. The battery of claim 1, wherein first and second tabs each comprise a width that extends along the length of the woven fabric strap, wherein the width of the first and second tabs is less than approximately 10 millimeters.

9. The battery of claim 8, wherein the handle assembly is capable of sustaining greater than 300 pounds (lbs.) of force in a first pull test at 70° F., greater than 180 lbs. in a second pull test at 120° F., and greater than 180 lbs. in a jerk test at 0° F.

10. A method of manufacturing a lead-acid battery:
disposing a handle assembly of the battery near a cover of a polymer packaging of a battery, wherein the handle assembly comprises:
a woven fabric strap capable of laying substantially flat over the cover of the battery;
a first tab overmolded about a first end of the woven fabric strap; and
a second tab overmolded about a second end of the woven fabric strap, wherein the first and second tabs each comprise tapered end portions having thicknesses less than a central portion disposed near the woven fabric strap;
loading the first tab of the handle assembly into a first slot inset into a first end portion of the cover of the polymer packaging while feeding the woven fabric strap through a first narrow region and into a first upper opening of the first slot, such that the woven fabric strap extends through the first upper opening of the first slot; and
loading the second tab of the handle assembly into a second slot inset into a second end portion of the cover of the polymer packaging while feeding the woven fabric strap through a second narrow region and into a second upper opening of the second slot, such that the woven fabric strap extends through the second upper opening of the second slot to yield the battery, wherein the tapered end portions of the first and second tabs enable the first and second tabs to respectively load into the first and second slots without obstructing a vent feature in the polymer packaging of the battery.

11. The method of claim 10, comprising manufacturing the handle assembly via a process comprising:
feeding the woven fabric strap into a polymer overmolding system;
overmolding the first and second tabs about the woven fabric strap; and
cutting the woven fabric strap beyond an outer side of the first and second tabs to yield the handle assembly.

12. The method of claim 11, wherein overmolding comprises simultaneously overmolding the first and second tabs about the woven fabric strap while overmolding a third tab and a fourth tab of other handle assemblies about the woven fabric strap beyond the outer side of the first and second tabs.

13. The method of claim 11, wherein overmolding comprises holding the woven fabric strap into position with a plurality of retaining features while overmolding the first and second tabs about the woven fabric strap.

14. The method of claim 10, wherein loading the first tab comprises facing a side of the first tab from which the woven fabric strap extends toward the cover of the polymer packaging, and wherein loading the second tab comprises facing a side of the second tab from which the woven fabric strap extends toward the cover of the polymer packaging.

15. The method of claim 10, wherein loading the first tab comprises facing a side of the first tab from which the woven fabric strap extends toward the first end portion of the polymer packaging, and wherein loading the second tab comprises facing a side of the second tab from which the woven fabric strap extends toward the second end portion of the polymer packaging.

16. A lead-acid battery, comprising:
a polymer packaging comprising:
a first slot inset into a first end portion of a cover of the polymer packaging and including a first upper opening defined in a top surface of the cover; and
a second slot inset into a second end portion of the cover of the polymer packaging and including a second upper opening defined in the top surface of the cover; and
a handle assembly coupled to the polymer packaging of the battery, wherein the handle assembly comprises:
a woven fabric strap capable of laying substantially flat over the cover of the battery;
a first tab overmolded about a first end of the woven fabric strap, wherein the first tab is loaded into the first slot of the polymer packaging, such that the woven fabric strap extends through the first upper opening in the top surface of the cover; and
a second tab overmolded about a second end of the woven fabric strap, wherein the second tab is loaded into the second slot of the polymer packaging, such that the woven fabric strap extends through the second upper opening in the top surface of the cover, and wherein the first and second tabs each comprise tapered end portions having thicknesses less than a central portion disposed near the woven fabric strap, and wherein the tapered end portions enable the first and second tabs to load into the first and second slots without obstructing a vent feature in the polymer packaging of the battery.

17. The battery of claim 16, wherein the polymer packaging and the handle assembly consist essentially of polypropylene.

18. The battery of claim 16, wherein the first and second upper openings each comprise a respective narrow region having a width that is smaller than a width of the woven fabric strap to maintain the position of the woven fabric strap in the first and second upper openings of the first and second slots.

19. The battery of claim 16, wherein the battery is an automotive battery.

20. The battery of claim 16, wherein the battery is a marine battery.

* * * * *